United States Patent
Tsukidate et al.

(10) Patent No.: US 10,597,040 B2
(45) Date of Patent: Mar. 24, 2020

(54) VEHICLE CONTROL APPARATUS

(71) Applicant: HITACHI AUTOMOTIVE SYSTEMS, LTD., Hitachinaka-shi, Ibaraki (JP)

(72) Inventors: Tsunamichi Tsukidate, Tokyo (JP); Tomohito Ebina, Ibaraki (JP); Tasuku Ishigooka, Tokyo (JP); Fumio Narisawa, Tokyo (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 0 days.

(21) Appl. No.: 16/300,478

(22) PCT Filed: Jun. 14, 2017

(86) PCT No.: PCT/JP2017/021907
§ 371 (c)(1),
(2) Date: Nov. 9, 2018

(87) PCT Pub. No.: WO2017/221778
PCT Pub. Date: Dec. 28, 2017

(65) Prior Publication Data
US 2019/0143999 A1  May 16, 2019

(30) Foreign Application Priority Data
Jun. 24, 2016 (JP) .................... 2016-125241

(51) Int. Cl.
B60W 50/029 (2012.01)
G06F 9/52 (2006.01)
(Continued)

(52) U.S. Cl.
CPC ........... B60W 50/029 (2013.01); B60R 16/02 (2013.01); B60W 50/0205 (2013.01);
(Continued)

(58) Field of Classification Search
CPC combination set(s) only.
See application file for complete search history.

(56) References Cited

U.S. PATENT DOCUMENTS

2004/0029556 A1\* 2/2004 Goto .................... B60L 3/12
  455/404.1
2009/0049254 A1\* 2/2009 Koga .................... G06F 13/161
  711/154

(Continued)

FOREIGN PATENT DOCUMENTS

JP  2004-017676 A  1/2004
JP  2005-242408 A  9/2005
(Continued)

OTHER PUBLICATIONS

International Search Report with English translation and Written Opinion issued in corresponding application No. PCT/JP2017/021907 dated Sep. 26, 2017.

*Primary Examiner* — Redhwan K Mawari
(74) *Attorney, Agent, or Firm* — Foley & Lardner LLP

(57) ABSTRACT

The present invention provides a vehicle control apparatus in which a function stop caused by an access conflict when a high load is applied can be suppressed. The vehicle control apparatus according to the present invention determines the occurrence tendency of access conflicts by using a function expressed by the number of times of performing exclusive control on a shared storage area and by the number of the resultant access conflicts.

14 Claims, 15 Drawing Sheets

(51) Int. Cl.
  *B60R 16/02*    (2006.01)
  *B60W 50/02*    (2012.01)
  *B60W 50/04*    (2006.01)
  *B60R 16/023*   (2006.01)

(52) U.S. Cl.
  CPC .............. *B60W 50/04* (2013.01); *G06F 9/52* (2013.01); *B60R 16/0232* (2013.01); *B60W 2050/0292* (2013.01)

(56) References Cited

U.S. PATENT DOCUMENTS

2013/0007763 A1* 1/2013 Yamashita ............ G06F 9/4881
  718/104
2019/0143999 A1* 5/2019 Tsukidate ................ B60R 16/02

FOREIGN PATENT DOCUMENTS

| | | |
|---|---|---|
| JP | 2009-048224 A | 3/2009 |
| JP | 2009-251871 A | 10/2009 |
| JP | 2013-239116 A | 11/2013 |
| JP | 2014-186454 A | 10/2014 |
| WO | WO-2011-114478 A1 | 9/2011 |

* cited by examiner

FIG. 4

| TIMER VALUE | NUMBER OF PERFORMING TIMES | NUMBER OF ALLOWABLE CONFLICTS |
|---|---|---|
| 0 | 0 | 0 |
| 1 | 1 | 1 |
| 2 | 2 | 3 |
| 3 | 3 | 5 |
| 4 | 4 | 6 |
| 5 | 5 | 8 |
| : | : | : |

FIG. 5

| TIMER VALUE | NUMBER OF TIMES OF PERFORMING EXCLUSIVE CONTROL | NUMBER OF CONFLICTS |
|---|---|---|
|  |  |  |
|  |  |  |
|  |  |  |
|  |  |  |
|  |  |  |
|  |  |  |
|  |  |  |

VEHICLE CONTROL APPARATUS

TECHNICAL FIELD

The present invention relates to a vehicle control apparatus that controls an operation of a vehicle.

BACKGROUND ART

In recent years, the amount of operation has been increasing year by year in embedded systems such as automobile systems along with multifunctionality, and the performance of a central processing unit (CPU) required for the embedded systems is increasing. In the field of personal computers, such an increase in throughput has been dealt with an increase of the number of cores (multicore) of the CPU which is an operation device. Even in the field of embedded systems is no exception, the multicore has progressed in consumer systems where the amount of operation is large and a constraint on a real-time property is relatively loose, such as a car navigation system and a cellular phone. As the embedded control systems such as automobile control systems become sophisticated and complicated, it is expected that the amount of operation thereof may exceed a limit of a single core, and thus, adoption of the multicore has been studied.

Meanwhile, the functional safety standard ISO 26262 (hereinafter referred to as the "functional safety standard") was formulated in 2011 in order to unify a software quality level in an automobile industry and to facilitate a safety verification. In this standard, a failure rate calculation method, a software design method, and the like are specified throughout the entire system including hardware and software. In order for the vehicle control apparatus to conform to this standard, it is necessary to present grounds for ensuring safety. In general, the compliance with the same standard is achieved by summarizing knowledge and achievements in conventional designs as evidences.

In the functional safety standard ISO 26262, it is required to prevent interference between pieces of software having different safety requirements. A general vehicle control apparatus is configured of various control applications, and thus, a mechanism configured to prevent interaction between pieces of software forming a system such as a time protection function and a memory protection function has attracted attention in recent years. For example, this is a function of preventing certain software running out of control from accessing a memory storing data used by another software and destroying the data.

When the functional safety standard ISO 26262 is applied to a general vehicle control apparatus, it is known that various automotive safety integrity level (ASIL) software coexist within the vehicle control apparatus. Thus, a mechanism for preventing interference between pieces of software and techniques such as speeding-up of processing, weight reduction, and improvement in reliability, related to the mechanism, are required in order for existing software to comply with the functional safety standard.

The following PTL 1 describes exclusive control for a shared resource. In this literature, an analysis target program acquires an access right (lock) of the shared resource and measures a time required for lock acquisition required for acquiring the lock in order to analyze whether a state of an access conflict with respect to the shared resource is normal. A predetermined number of most recent lock acquisition required times are integrated and an allowable range to be allowed as the lock acquisition required time is calculated based on the integrated lock acquisition required time. If the latest lock acquisition required time is included in the allowable range, it is analyzed that the state of the access conflict with respect to the shared resource is normal.

CITATION LIST

Patent Literature

PTL 1: JP 2009-251871 A

SUMMARY OF INVENTION

Technical Problem

In a multicore system, each core operates independently so that operation processes can be executed in parallel. On the other hand, when the respective cores share a storage area, an access conflict with respect to the storage area occurs between the cores. When the access conflict occurs, one core is designed to wait for completion of execution processing of the other core by exclusive control. When the exclusive control is incorporated in the vehicle control apparatus for high-load processing, waiting caused by the exclusive control increases as the load is high. Then, there is a possibility that vehicle control falls into a function stop.

The present invention has been made in view of the above-described problems, and an object of the present invention is to provide a vehicle control apparatus in which a function stop caused by an access conflict when a high load is applied can be suppressed.

Solution to Problem

The vehicle control apparatus according to the present invention determines an occurrence tendency of access conflicts by using a function expressed by the number of times of performing exclusive control on a shared storage area and by the number of the resultant access conflicts.

Advantageous Effects of Invention

According to the vehicle control apparatus of the present invention, it is possible to suppress the function stop caused by the access conflict with respect to the shared storage area when the high load is applied and to improve safety and availability.

BRIEF DESCRIPTION OF DRAWINGS

FIG. 4 is a table illustrating a configuration and a data example of a number-of-allowable-conflicts table 50300.

FIG. 5 is a table illustrating a configuration and a data example of a conflict record table 50400.

DESCRIPTION OF EMBODIMENTS

First Embodiment

Figure 1:
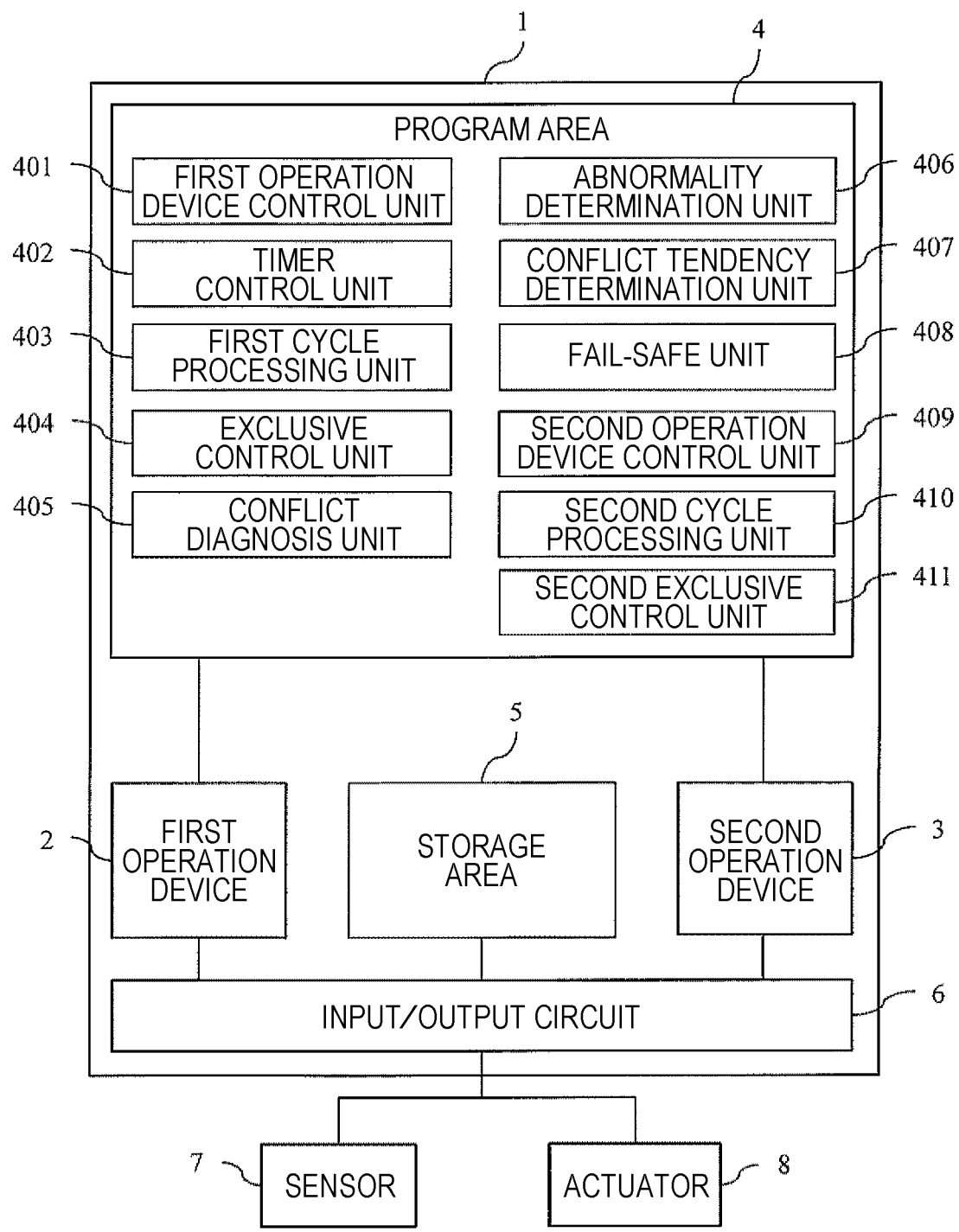
FIG. 1 is a configuration diagram of a vehicle control apparatus (ECU) 1 according to a first embodiment.

FIG. 1 is a configuration diagram of a vehicle control apparatus (ECU) 1 according to a first embodiment of the present invention. The ECU 1 is a device that controls an operation of a vehicle such as an engine control device and includes a first operation device 2, a second operation device 3, a program area 4, a storage area 5, and an input/output circuit 6. Here, a throttle sensor 7 and an actuator 8 are exemplified as devices to which the ECU 1 is connected, but the invention is not limited thereto.

The first operation device 2 and the second operation device 3 are operation devices that execute a program stored in the program area 4. The first operation device 2 and the second operation device 3 can execute programs stored in the program area 4 in parallel, and further, can access the program area 4 and the storage area 5 in parallel.

The program area 4 is a storage area configured on a nonvolatile storage device such as a read only memory (ROM). The program area 4 stores a first operation device control unit 401, a timer control unit 402, a first cycle processing unit 403, an exclusive control unit 404, a conflict diagnosis unit 405, an abnormality determination unit 406, a conflict tendency determination unit 407, a fail-safe unit 408, a second operation device control unit 409, a second cycle processing unit 410, and a second exclusive control unit 411.

The storage area 5 is a storage area on a storage device such as a ramdom access memory (RAM), for example. The storage area 5 temporarily stores data to be used when the first operation device 2 and the second operation device 3 execute control operation. The storage area 5 further stores a data table to be described later with reference to FIGS. 2 to 5. The first operation device 2 and the second operation device 3 can access the program area 4 and the storage area 5 in parallel, respectively. Therefore, there is a possibility that access conflicts may occur.

Figure 2:
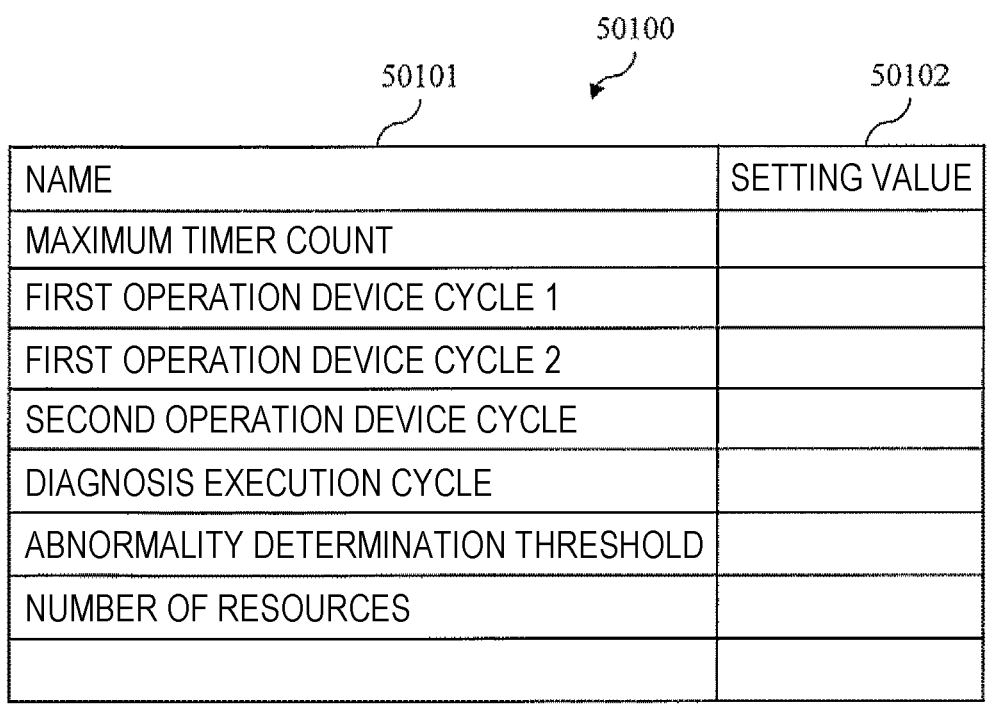
FIG. 2 is a table illustrating a configuration and a data example of a parameter table 50100 stored in a storage area 5.

FIG. 2 is a table illustrating a configuration and a data example of a parameter table 50100 stored in the storage area 5. The parameter table 50100 is a data table that holds setting parameters to be used when the ECU 1 executes the control operation. This table is stored in the storage area 5 for convenience of description, but may be stored in other storage devices. The parameter table 50100 has a name field 50101 and a setting value field 50102.

The name field 50101 holds a name of data managed by the parameter table 50100. The setting value field 50102 holds parameter setting values. Details of each parameter illustrated in FIG. 2 will be described together with an operation of each program to be described later.

Figure 3:
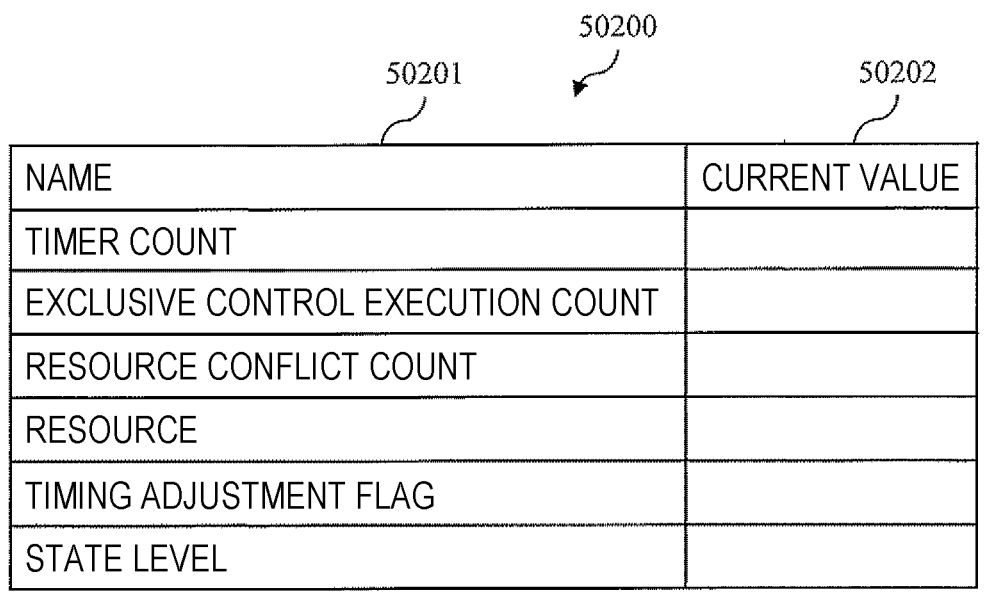
FIG. 3 is a table illustrating a configuration and a data example of a record table 50200 stored in the storage area 5.

FIG. 3 is a table illustrating a configuration and a data example of a record table 50200 stored in the storage area 5. The record table 50200 is a data table that stores a current value of each variable in the course of the control operation performed by the ECU 1. The record table 50200 has a name field 50201 and a current value field 50202.

The name field 50201 holds the name of the variable managed by the record table 50200. The current value field 50202 holds the current value of the variable. Details of each data illustrated in FIG. 3 will be described together with the operation of each program to be described later.

FIG. 4 is a table illustrating a configuration and a data example of a number-of-allowable-conflicts table 50300. The number-of-allowable-conflicts table 50300 is a data table that describes the number of times where an occurrence of the access conflict is allowed with respect to the number of times of performing exclusive control for a resource (for example, the storage area 5) shared by the first operation device 2 and the second operation device 3. For example, this data table can be created in advance based on experiments or the like. This table is stored in the storage area 5 for convenience of description, but may be stored in other storage devices. The number-of-allowable-conflicts table 50300 has a timer value field 50301, an of-performing-times field 50302, and a number-of-allowable-conflicts field 50303.

The timer value field 50301 holds a value (corresponding to a time) of a timer count. The of-performing-times field 50302 holds a value obtained by integrating the number of times of performing exclusive control assumed to be executed at each time from a start time. The number-of-allowable-conflicts field 50303 holds a value allowed as an integrated value of the number of access conflicts at each time.

FIG. 5 is a table illustrating a configuration and a data example of a conflict record table 50400. The conflict record table 50400 is a data table recording access conflicts generated by exclusive control. The conflict record table 50400 has a timer value field 50401, a number-of-times-of-performing-exclusive-control field 50402, and a number-of-conflicts field 50403.

The timer value field 50401 holds a value (corresponding to a time) of the timer count. The number-of-times-of-performing-exclusive-control field 50402 holds an integrated value of the performed exclusive control from a start time to each time. The number-of-conflicts field 50403 holds an integrated value of the number of access conflicts at each time.

Figure 6:
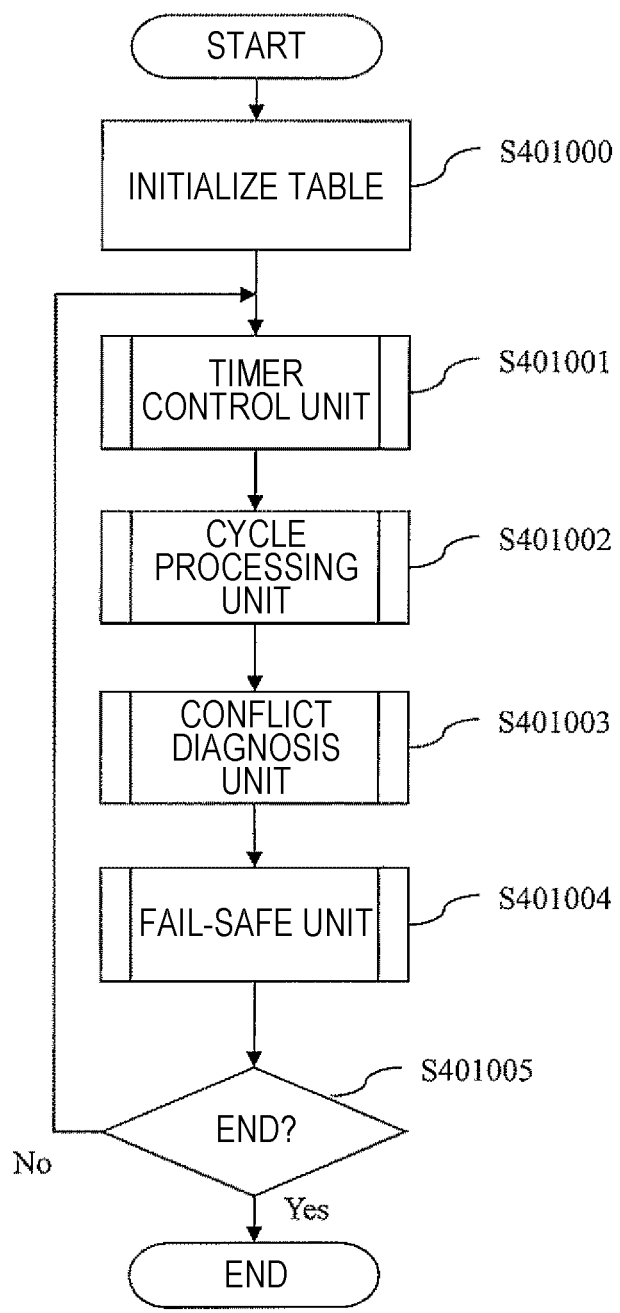
FIG. 6 is a flowchart for describing an operation of a first operation device control unit 401.

FIG. 6 is a flowchart for describing an operation of the first operation device control unit 401. The first operation device control unit 401 executes this flowchart at predetermined intervals, for example. Each step of FIG. 6 will be described hereinafter.

(FIG. 6: Step S401000)

The first operation device control unit 401 initializes the record table 50200 stored in the storage area 5. An object to be initialized may be the entire record table 50200 or only a value to be referred to by the first operation device control unit 401.

(FIG. 6: Step S401001)

The first operation device control unit 401 calls the timer control unit 402. An operation of the timer control unit 402 will be described later with reference to FIG. 7. The timer control unit 402 serves a role of updating the timer count.
(FIG. 6: Step S401002)

The first operation device control unit 401 calls the first cycle processing unit 403. An operation of the first cycle processing unit 403 will be described later with reference to FIG. 8. The first cycle processing unit 403 serves a role of controlling a cycle in which the first operation device 2 executes processing.
(FIG. 6: Step S401003)

The first operation device control unit 401 calls the conflict diagnosis unit 405. An operation of the conflict diagnosis unit 405 will be described later with reference to FIG. 10. The conflict diagnosis unit 405 serves a role of diagnosing whether an access conflict has occurred between the first operation device 2 and the second operation device 3.
(FIG. 6: Step S401004)

The first operation device control unit 401 calls the fail-safe unit 408. An operation of the fail-safe unit 408 will be described later with reference to FIG. 13. The fail-safe unit 408 serves a role of executing a fail-safe process in accordance with a situation of the access conflict.
(FIG. 6: Step S401005)

The first operation device control unit 401 determines whether an end condition is satisfied. This flowchart is ended if the condition is satisfied, and the processing returns to step S401001 if the condition is not satisfied.

Figure 7:
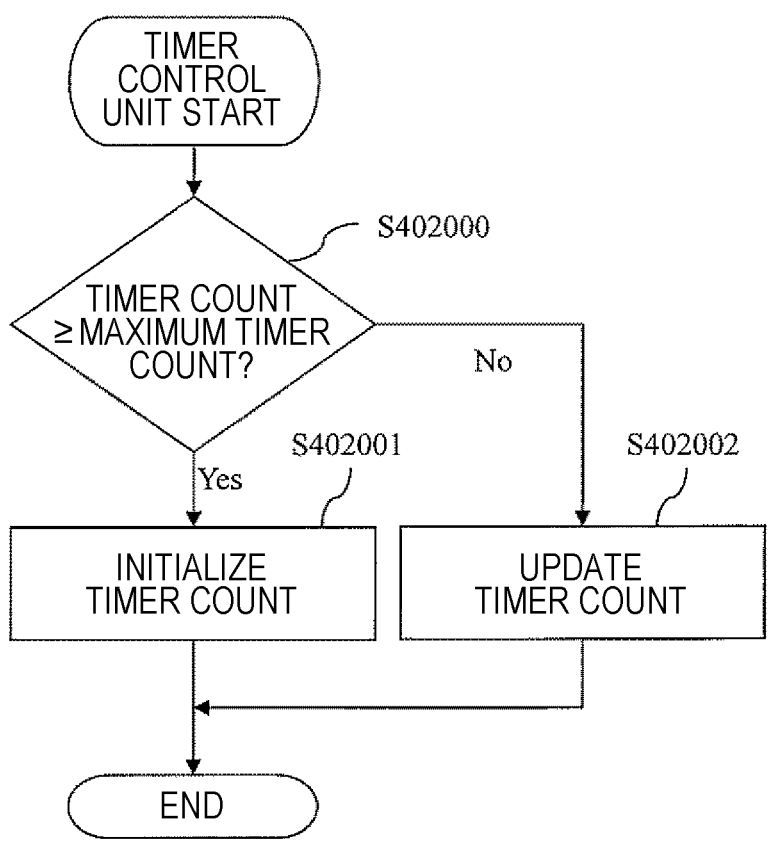
FIG. 7 is a flowchart for describing an operation of a timer control unit 402.

FIG. 7 is a flowchart for describing an operation of the timer control unit 402. Each step of FIG. 7 will be described hereinafter.
(FIG. 7: Step S402000)

The timer control unit 402 acquires the current value field 50202 of the timer count from the record table 50200. The timer control unit 402 further acquires the setting value field 50102 of a maximum timer count from the parameter table 50100. The timer control unit 402 compares the acquired timer count with the maximum timer count. If the timer count is equal to or larger than the maximum timer count, the processing proceeds to step S402001; otherwise, the processing proceeds to step S402002.
(FIG. 7: Step S402001)

The timer control unit 402 substitutes zero for the current value field 50202 of the timer count of the record table 50200.
(FIG. 7: Step S402002)

The timer control unit 402 writes a value obtained by adding one to the current value field 50202 of the timer count of the record table 50200.
(FIG. 7: Steps S402000 to S402002: Supplement)

These steps are processes configured to reset the timer count every predetermined cycle (here, the maximum timer count) to start counting from zero again.

Figure 8:
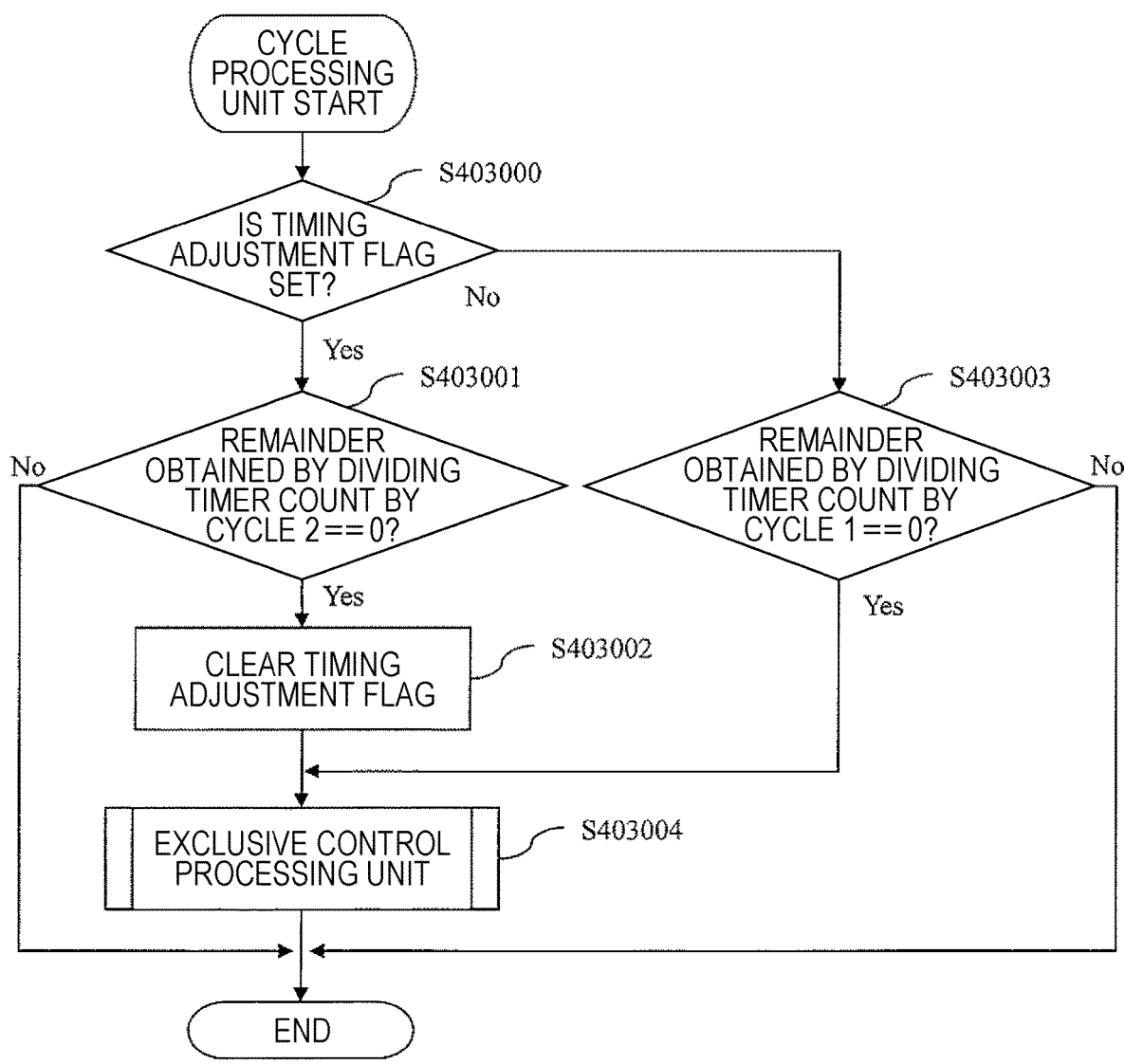
FIG. 8 is a flowchart for describing an operation of a first cycle processing unit 403.

FIG. 8 is a flowchart for describing the operation of the first cycle processing unit 403. Each step of FIG. 8 will be described hereinafter.
(FIG. 8: Step S403000))

The first cycle processing unit 403 acquires the current value field 50202 of a timing adjustment flag from the record table 50200. When the timing adjustment flag is set, the processing proceeds to step S403001; otherwise, the processing proceeds to step S403003. The timing adjustment flag is a flag to be set in FIG. 13 which will be described later.
(FIG. 8: Step S403001)

The first cycle processing unit 403 acquires the setting value field 50102 of a first operation device cycle 2 from the parameter table 50100. The first cycle processing unit 403 further acquires the current value field 50202 of the timer count from the record table 50200. The first cycle processing unit 403 obtains a remainder obtained by dividing the timer count by the first operation device cycle 2. If the remainder is zero, the processing proceeds to step S403002; otherwise, the flowchart is ended.
(FIG. 8: Step S403002)

The first cycle processing unit 403 clears the current value field 50202 with the timing adjustment flag of the record table 50200 (for example, writes zero).
(FIG. 8: Steps S403001 to S403002: Supplement)

Through these steps, the cycle in which the first operation device 2 executes the control operation is temporarily changed. When an access conflict occurs, a timing adjustment flag to be described later is set to change an execution timing of the first operation device 2 by these steps, whereby it is possible to eliminate the access conflict. A method of adjusting the execution timing is not limited thereto. For example, a method (a) of shifting the execution timing not temporarily but constantly, a method (b) of not performing the cycle processing for a fixed period, and the like are conceivable.
(FIG. 8: Step S403003)

The first cycle processing unit 403 acquires the setting value field 50102 of a first operation device cycle 1 from the parameter table 50100. The first cycle processing unit 403 further acquires the current value field 50202 of the timer count from the record table 50200. The first cycle processing unit 403 obtains the remainder obtained by dividing the timer count by the first operation device cycle 1. If the remainder is zero, the processing proceeds to step S403004; otherwise, the flowchart is ended.
(FIG. 8: Step S403004)

The first cycle processing unit 403 calls the exclusive control unit 404. An operation of the exclusive control unit 404 will be described later with reference to FIG. 9. The exclusive control unit 404 serves a role of performing exclusive control on a resource (for example, the storage area 5) shared by the first operation device 2 and the second operation device 3 from the first operation device 2 side.

Figure 9:
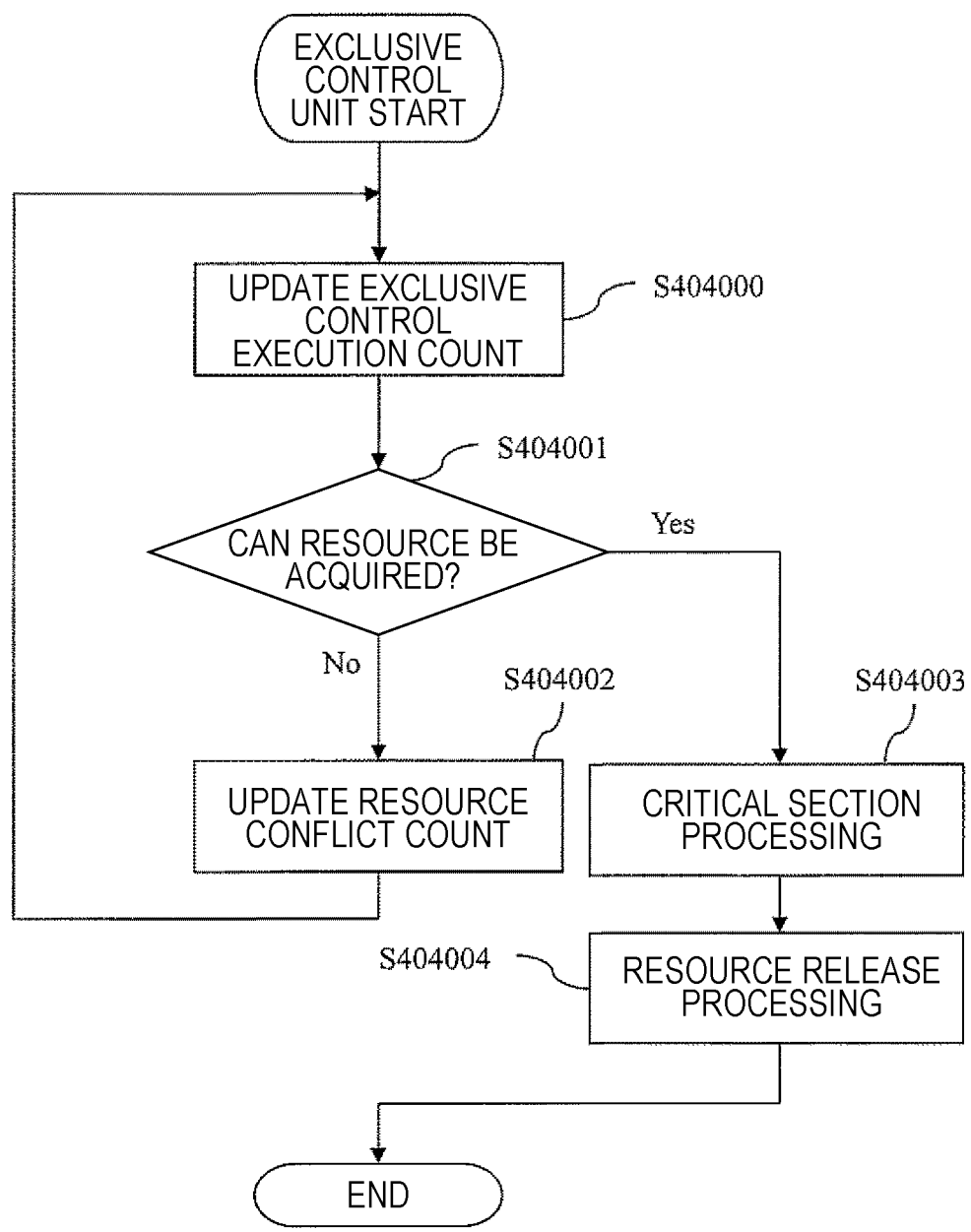
FIG. 9 is a flowchart for describing an operation of an exclusive control unit 404.

FIG. 9 is a flowchart illustrating the operation of the exclusive control unit 404. Each step of FIG. 9 will be described hereinafter.
(FIG. 9: Step S404000)

The exclusive control unit 404 updates the number of times of performing exclusive control by adding one to the current value field 50202 of the exclusive control execution count of the record table 50200.
(FIG. 9: Step S404001)

The exclusive control unit 404 refers to the current value field 50202 of a resource of the record table 50200. This field holds a flag indicating whether a resource (for example, the storage area 5) accessed commonly by the first operation device 2 and the second operation device 3 is accessible.

It is possible to determine whether the resource can be acquired by referring to the flag. The processing proceeds to step S404002 if it is difficult to acquire the resource, and the processing proceeds to step S404003 if the resource can be acquired.
(FIG. 9: Step S404002)

The exclusive control unit 404 updates the number of access conflicts by adding one to the current value field 50202 of a resource conflict count in the record table 50200. After this step, the processing may return to step S404000 to try again to acquire the resource, or the present flowchart may be ended and the processing waits for the next execution cycle. The former is exemplified in FIG. 9.

(FIG. 9: Step S404003)

The exclusive control unit 404 updates the current value field 50202 of a resource of the record table 50200 to a flag indicating inaccessibility. The exclusive control unit 404 executes a process of locking a shared resource (critical section process) to perform exclusive control on the acquired shared resource, and then, performs predetermined control operation.

(FIG. 9: Step S404004)

The exclusive control unit 404 updates the current value field 50202 of a resource of the record table 50200 to a flag indicating accessibility.

Figure 10:
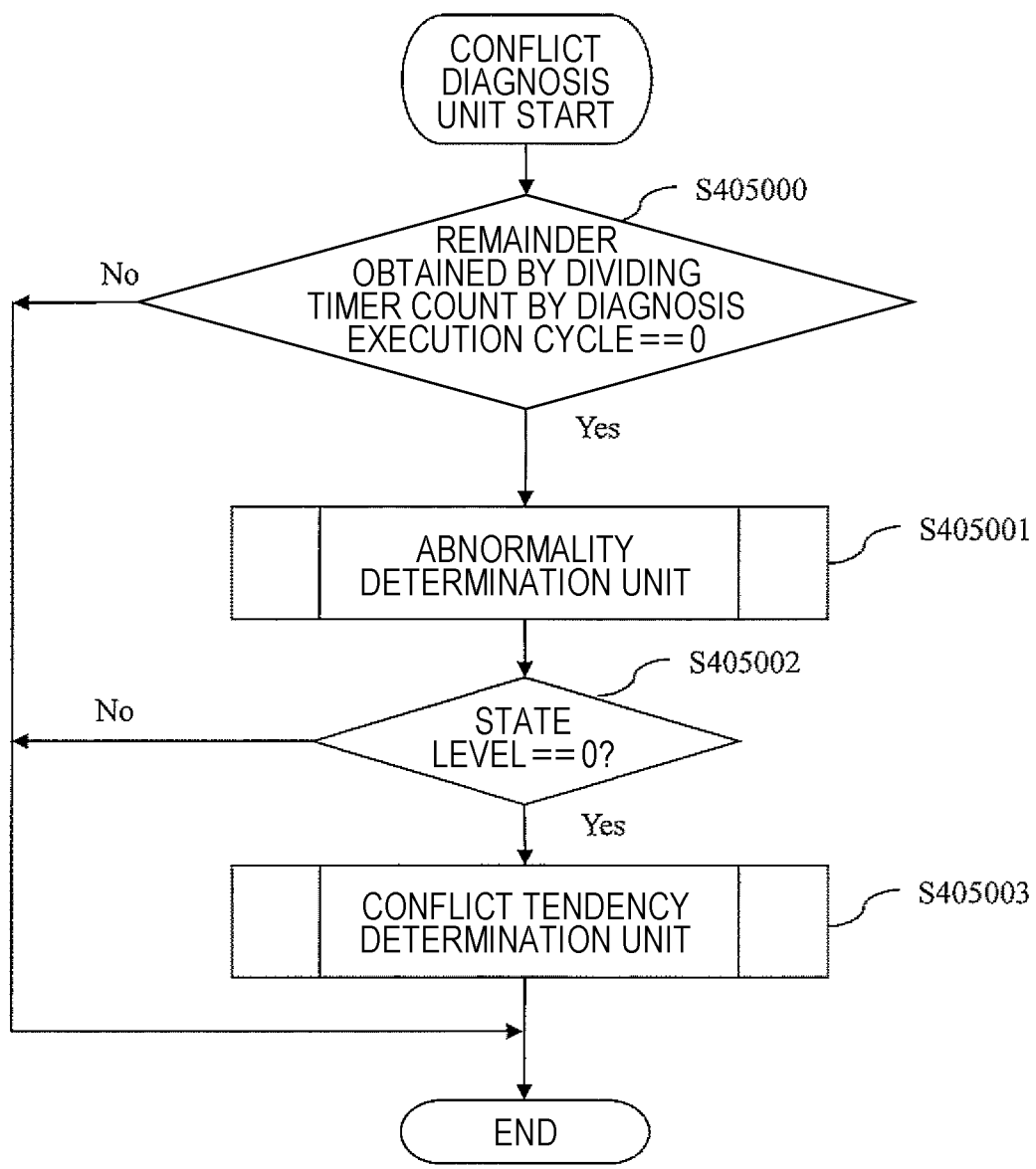
FIG. 10 is an operation flow of a conflict diagnosis unit 405.

FIG. 10 illustrates an operation flow of the conflict diagnosis unit 405. Each step of FIG. 10 will be described hereinafter.

(FIG. 10: Step S405000)

The conflict diagnosis unit 405 acquires the current value field 50202 of a timer count from the record table 50200. The conflict diagnosis unit 405 further acquires the setting value field 50102 of a diagnosis execution cycle from the parameter table 50100. The conflict diagnosis unit 405 obtains a remainder obtained by dividing the timer count by the diagnosis execution cycle. If the remainder is zero, the processing proceeds to step S405001; otherwise, this flowchart is ended.

(FIG. 10: Step S405001)

The conflict diagnosis unit 405 calls the abnormality determination unit 406. An operation of the abnormality determination unit 406 will be described later with reference to FIG. 11. The abnormality determination unit 406 serves a role of determining whether the ECU 1 is in an abnormal state due to an access conflict.

(FIG. 10: Step S405002)

The conflict diagnosis unit 405 acquires the current value field 50202 of a state level from the record table 50200. If the state level is zero, the processing proceeds to step S405003; otherwise, the flowchart is ended.

(FIG. 10: Step S405003)

The conflict diagnosis unit 405 calls the conflict tendency determination unit 407. An operation of the conflict tendency determination unit 407 will be described later with reference to FIG. 12. The conflict tendency determination unit 407 serves a role of determining any degree of a tendency of an occurrence of an access conflict.

Figure 11:
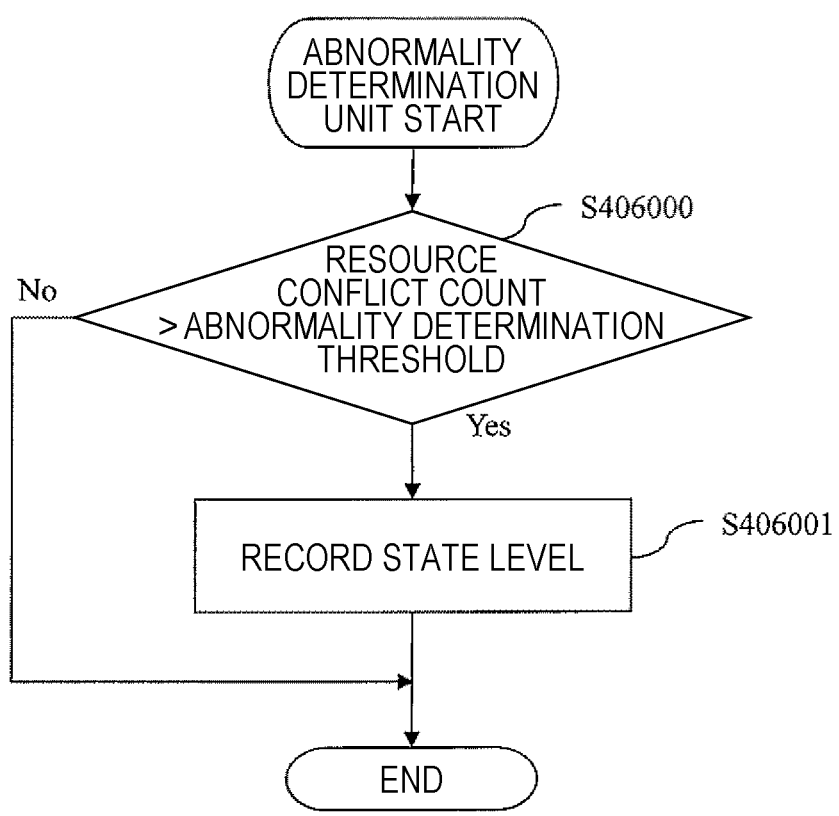
FIG. 11 is a flowchart for describing an operation of an abnormality determination unit 406.

FIG. 11 is a flowchart illustrating the operation of the abnormality determination unit 406. Each step of FIG. 11 will be described hereinafter.

(FIG. 11: Step S406000)

The abnormality determination unit 406 acquires the setting value field 50102 of an abnormality determination threshold from the parameter table 50100. The abnormality determination unit 406 further acquires the current value field 50202 of a resource conflict count from the record table 50200. If the resource conflict count is larger than the abnormality determination threshold, the processing proceeds to step S406001; otherwise, the flowchart is ended.

(FIG. 11: Step S406001)

The abnormality determination unit 406 updates the current value field 50202 of a state level of the record table 50200 to a value indicating that an access conflict is serious. This is because, when the number of occurrences of access conflicts (resource conflict count) exceeds the abnormality determination threshold, it can be considered that many access conflicts occur to exceed an allowable range. In the first embodiment, the state level =2 indicates such a fact.

Figure 12:
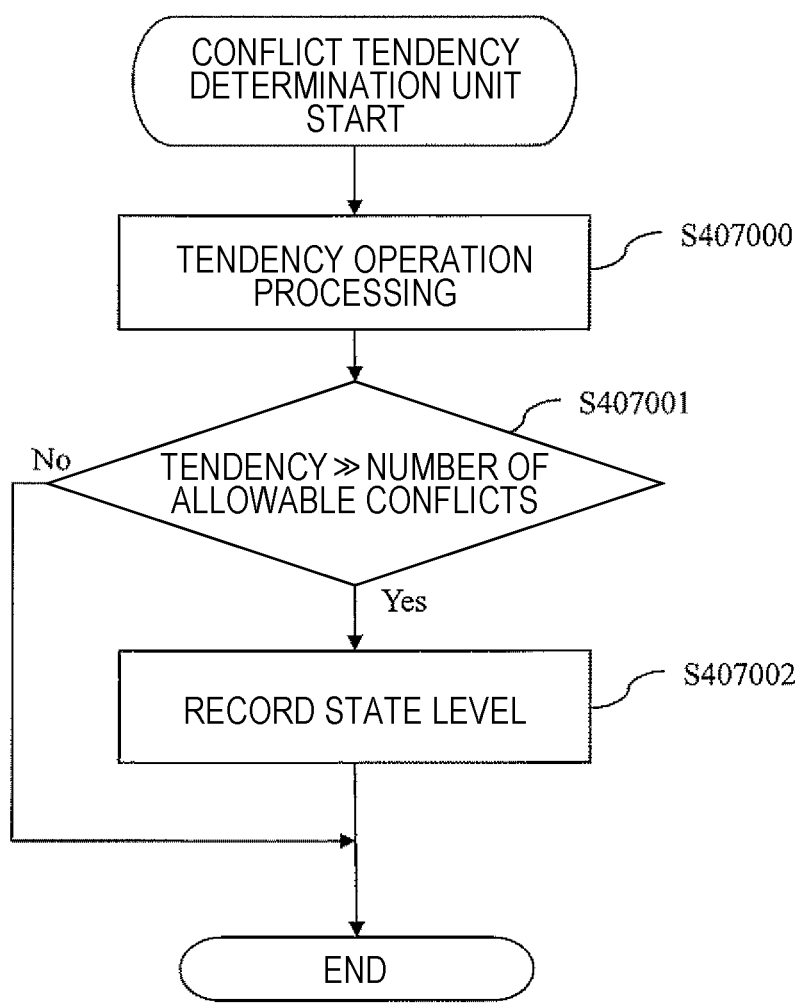
FIG. 12 is a flowchart illustrating an operation of a conflict tendency determination unit 407.

FIG. 12 is a flowchart illustrating the operation of the conflict tendency determination unit 407. Each step of FIG. 12 will be described hereinafter.

(FIG. 12: Step S407000)

The conflict tendency determination unit 407 acquires the current value field 50202 (representing a current time) of a timer count of the record table 50200. The conflict tendency determination unit 407 acquires a record corresponding to the current time from the conflict record table 50400 and the number-of-conflicts field 50403 of the record to acquire an access conflict tendency at the current time.

(FIG. 12: Step S407001)

The conflict tendency determination unit 407 acquires a record corresponding to the current time from the number-of-allowable-conflicts table 50300 and the number-of-allowable-conflicts field 50303 of the record. The conflict tendency determination unit 407 determines whether the access conflict tendency exceeds the number of allowable conflicts. If the access conflict tendency exceeds the number of allowable conflicts, the processing proceeds to step S407002; otherwise, this flowchart is ended.

(FIG. 12: Step S407002)

The conflict tendency determination unit 407 updates the current value field 50202 of a state level of the record table 50200 to a value indicating that the access conflict tends to occur. When the number-of-conflicts field 50403 exceeds the number-of-allowable-conflicts field 50303 at any time, the access conflict exceeds the allowable range at least at that time. In the first embodiment, the state level =1 indicates such a fact.

Figure 13:
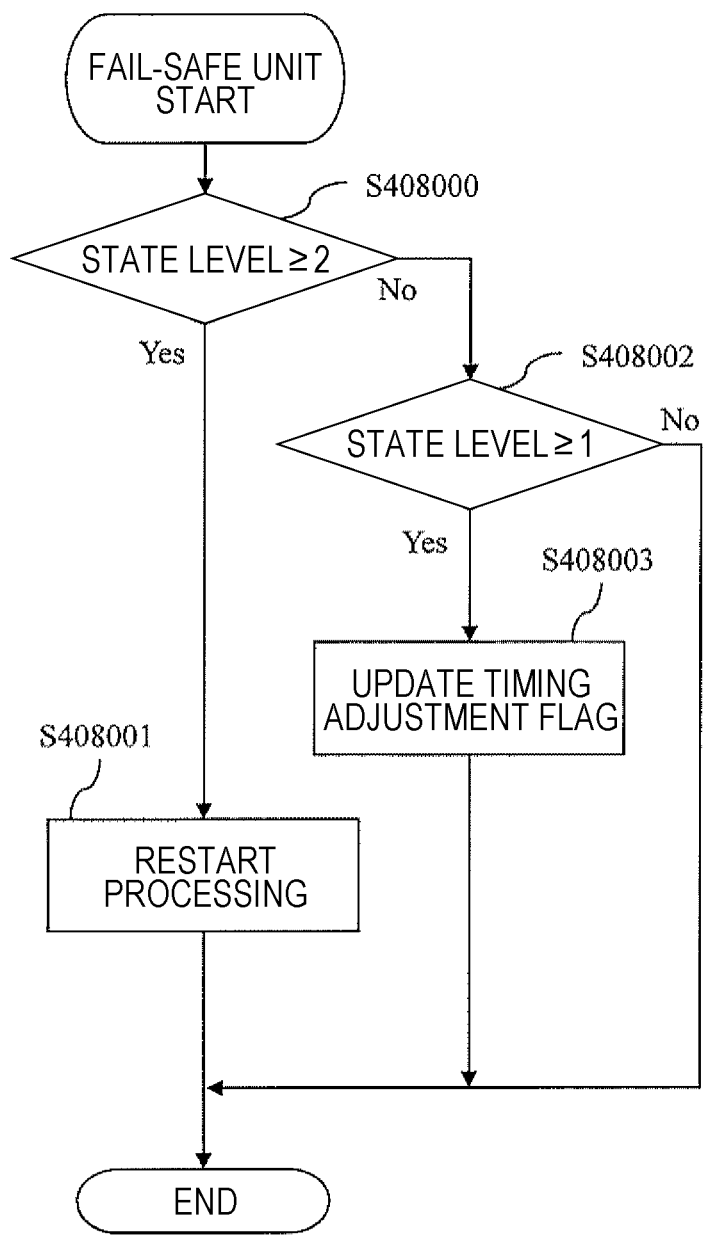
FIG. 13 is a flowchart for describing an operation of a fail-safe unit 408.

FIG. 13 is a flowchart illustrating the operation of the fail-safe unit 408. Each step of FIG. 13 will be described hereinafter.

(FIG. 13: Step S408000)

The fail-safe unit 408 acquires the current value field 50202 of a state level of the record table 50200. If the state level is two or more, the processing proceeds to step S408001; otherwise, the processing proceeds to step S408002.

(FIG. 13: Step S408001)

The fail-safe unit 408 performs a fail-safe process by restarting any one of the following: (a) the first operation device 2; (b) the first operation device 2 and the second operation device 3; and (c) the ECU 1 as a whole.

(FIG. 13: Step S408002)

The fail-safe unit 408 acquires the current value field 50202 of a state level of the record table 50200. If the state level is one or more, the processing proceeds to step S408003; otherwise, this flowchart is ended.

(FIG. 13: Step S408003)

The fail-safe unit 408 sets the current value field 50202 of a timing adjustment flag of the record table 50200 (for example, writes one).

Figure 14:
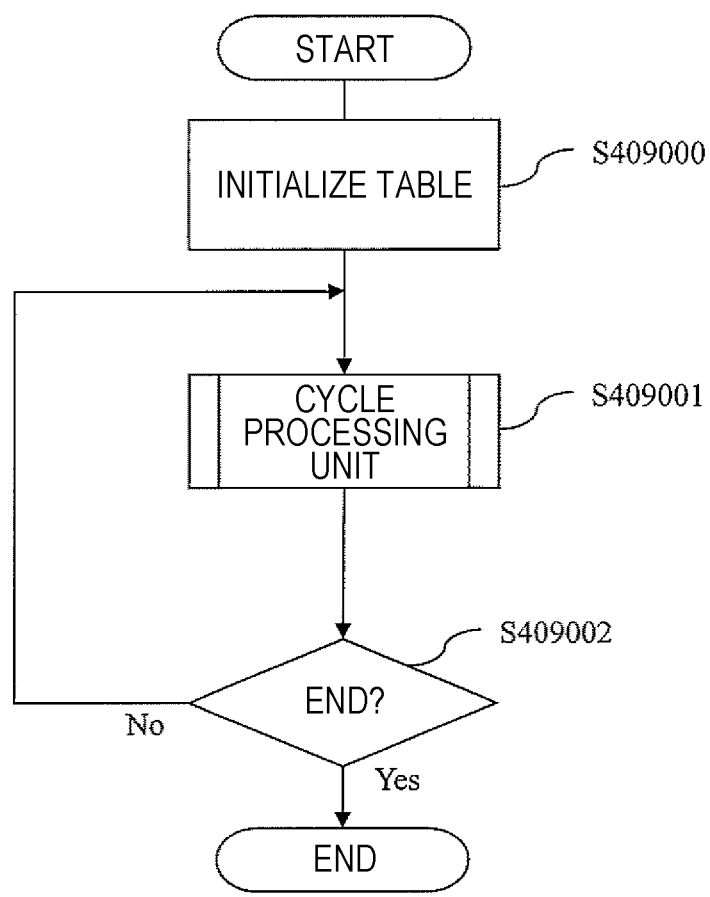
FIG. 14 is a flowchart for describing an operation of a second operation device control unit 409.

FIG. 14 is a flowchart for describing an operation of the second operation device control unit 409. The second operation device control unit 409 executes this flowchart every predetermined cycle, for example. Each step of FIG. 14 will be described hereinafter.

(FIG. 14: Step S409000)

The second operation device control unit 409 initializes a data table stored in the storage area 5. A target to be initialized may be the entire data table or only a value referred to by the second operation device control unit 409. However, it suffices that the target of this step is set to not a data table (for example, the record table 50200 or the like) to be initialized by the first operation device control unit 401 but data used only by the second operation device 3.

(FIG. 14: Step S409001)

The second operation device control unit 409 calls the second cycle processing unit 410. An operation of the second cycle processing unit 410 will be described later with reference to FIG. 15. The second cycle processing unit 410 serves a role of controlling a cycle in which the second operation device 3 executes processing.

(FIG. 14: Step S409002)

The second operation device control unit 409 determines whether an end condition is satisfied. This flowchart is ended if the condition is satisfied, and the processing returns to step S409001 if the condition is not satisfied.

Figure 15:
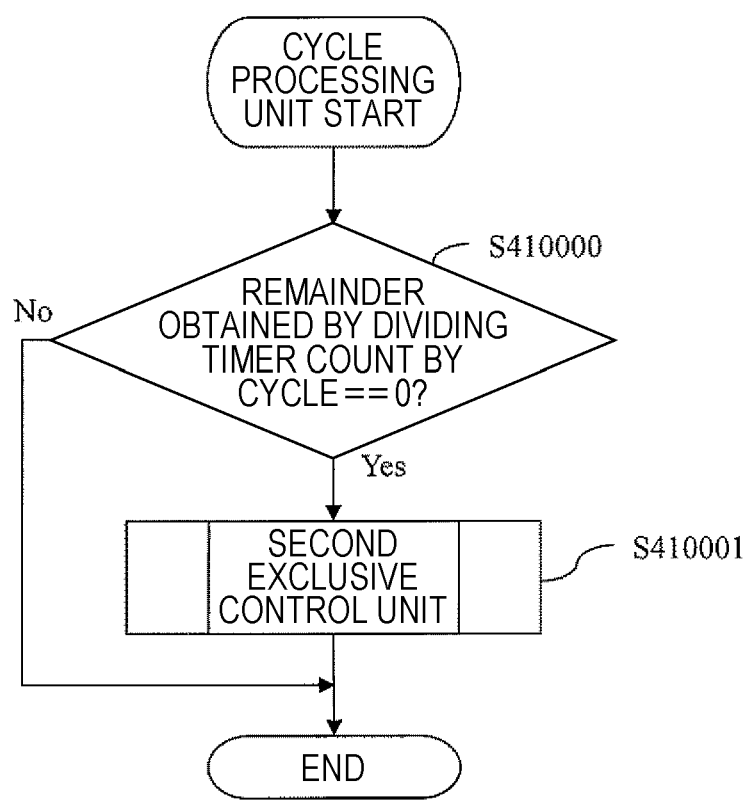
FIG. 15 is a flowchart for describing an operation of a second cycle processing unit 410.

FIG. 15 is a flowchart for describing the operation of the second cycle processing unit 410. Each step of FIG. 15 will be described hereinafter.

(FIG. 15: Step S410000)

The second cycle processing unit 410 acquires the current value field 50202 of a timer count from the record table 50200. The second cycle processing unit 410 further acquires the setting value field 50102 of a second operation device cycle from the parameter table 50100. The second cycle processing unit 410 obtains a remainder obtained by dividing the timer count by the second operation device cycle. If the remainder is zero, the processing proceeds to step S410001; otherwise, the flowchart is ended.

(FIG. 15: Step S410001)

The second cycle processing unit 410 calls the second exclusive control unit 411. An operation of the second exclusive control unit 411 will be described later with reference to FIG. 16. The second exclusive control unit 411 serves a role of executing exclusive control on a resource (for example, the storage area 5) shared by the first operation device 2 and the second operation device 3 from the second operation device 3 side.

Figure 16:
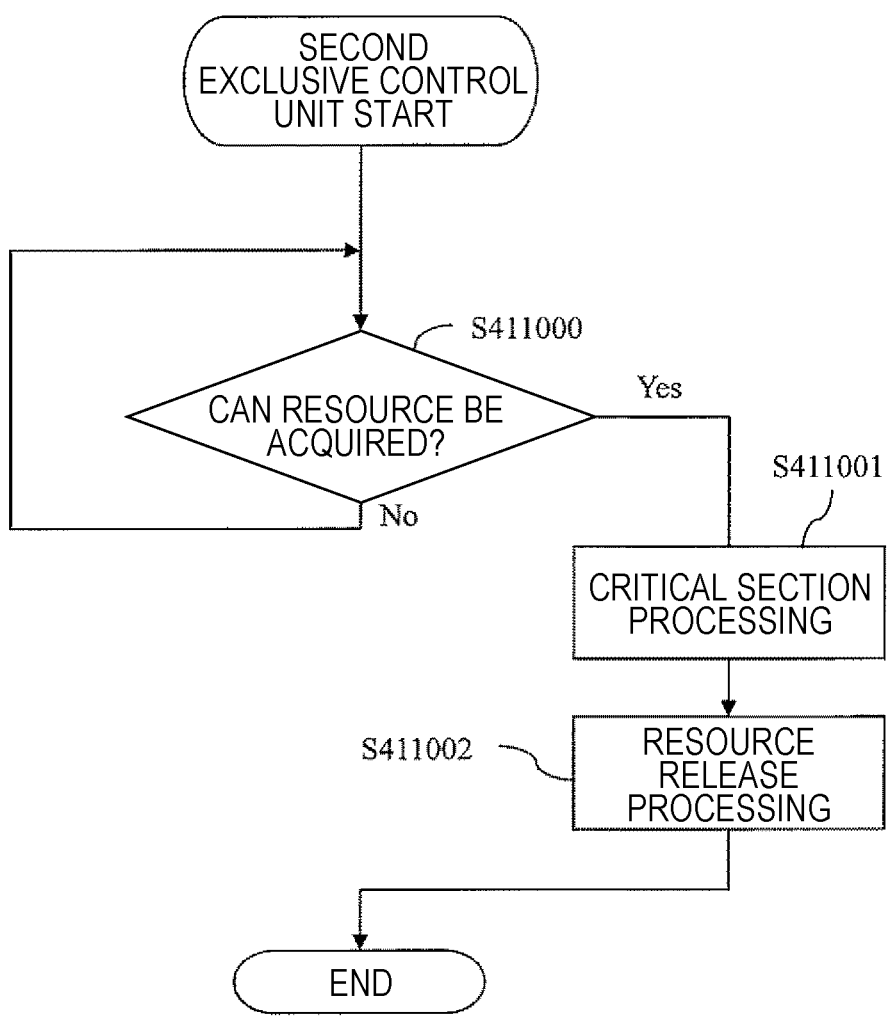
FIG. 16 is a flowchart illustrating an operation of a second exclusive control unit 411.

FIG. 16 is a flowchart illustrating the operation of the second exclusive control unit 411. Each step of FIG. 16 will be described hereinafter.

(FIG. 16: Step S411000)

The second exclusive control unit 411 refers to the current value field 50202 of a resource of the record table 50200 to determine whether the resource can be acquired. If it is difficult to acquire the resource, this step is repeated after waiting for a predetermined time, for example. If the resource can be acquired, the processing proceeds to step S411001.

(FIG. 16: Step S411001)

The second exclusive control unit 411 updates the current value field 50202 of a resource of the record table 50200 to a flag indicating inaccessibility. 'The exclusive control unit 404 executes a process of locking a shared resource (critical section process) to perform exclusive control on the acquired shared resource, and then, performs predetermined control operation.

(FIG. 16: Step S411002)

The second exclusive control unit 411 updates the current value field 50202 of a resource of the record table 50200 to a flag indicating accessibility.

First Embodiment: Summary

When the number of access conflicts exceeds a predetermined reference value (the number of allowable conflicts 50303 described in the number-of-allowable-conflicts table 50300), the ECU 1 according to the first embodiment sets the timing adjustment flag (S408003) to temporarily change the execution cycle of the first operation device 2 As a result, it is possible to avoid the ECU 1 from entering an operation stop state due to the access conflict when a load increases.

Second Embodiment

In the first embodiment, the access conflict tendency is determined based on whether the integrated value of the number of access conflicts for each time exceeds the number of allowable conflicts 50303. Instead, the access conflict tendency is determined based on whether an increase rate of an access conflict probability exceeds a threshold in a second embodiment of the present invention. Since the other configuration is the same as that of the first embodiment, differences will be mainly described hereinafter.

Figure 17:
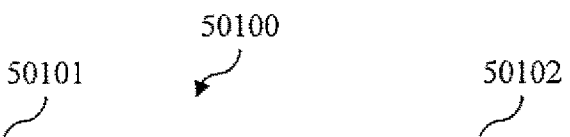
FIG. 17 is a table illustrating a configuration and a data example of a parameter table 50100 according to a second embodiment.

FIG. 17 is a table illustrating a configuration and a data example of the parameter table 50100 according to the second embodiment. In the second embodiment, the parameter table 50100 newly holds a setting value of an "allowable conflict tendency". The significance of this parameter will be described hereinafter.

When the integrated value of access conflicts exceeds the allowable range at a certain time, the state level is set to one to temporarily change the execution cycle of the first operation device 2 in the first embodiment. However, it is considered that a tendency that the access conflict frequently occurs is not limited thereto. For example, when a probability of occurrences of access conflicts increases instantaneously, it is assumed that the access conflict exceeds the allowable range in the near future. Therefore, the conflict is avoided by capturing such an instantaneous increase of the access conflict probability and shifting the execution cycle of the first operation device 2 beforehand in the second embodiment.

In order to realize the above-described configuration, first, a "conflict probability=the number of access conflicts/the number of times of performing exclusive control" is defined in the second embodiment. Since the number of access conflicts and the number of times of performing exclusive control are measured in cooperation with a timer count, the conflict probability becomes a function of time. It is possible to calculate an instantaneous variation of the conflict probability by temporally differentiating this conflict probability. This time differential value is used as an access conflict tendency in the second embodiment. Specifically, it suffices that the conflict tendency determination unit 407 calculates the time differential value in step S407000. In step S407001, the conflict tendency determination unit 407 can determine the access conflict tendency by comparing the calculated time differential value with the setting value field 50102 of an "allowable conflict tendency". When the time differential value exceeds the allowable conflict tendency, a state level is set to one in step S407002.

Second Embodiment: Summary

The ECU 1 according to the second embodiment captures the instantaneous increase of the access conflict probability and temporarily shifts the execution cycle of the first operation device 2 in advance before the access conflict exceeds the allowable range. As a result, it is possible to prevent the occurrence of the access conflict and the ECU 1 from entering the operation stop state in advance.

Regarding Modification Examples of the Present Invention

Incidentally, the present invention is not limited to the above-described embodiments, and includes various modification examples. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. In addition, addition, deletion or substitution of other configurations can be made with respect to some configurations of each embodiment.

Although the ECU 1 includes the two operation devices in the above embodiments, the number of operation devices is not limited to two. A system having three or more processors or processor cores in one package or a system constituted by a plurality of packages each having a processor core is also an object of the present invention.

Although FIG. 1 is exemplified as the configuration of the ECU 1 in the above embodiments, other configurations may be provided. For example, the ECU 1 can include a non-volatile memory (backup RAM) configured to save data, a local memory that each operation device can access at high speed, sensors other than those illustrated in FIG. 1, and the like.

The access conflict tendency is determined based on the integrated value of the number of access conflicts at each time in the first embodiment, and the access conflict tendency is determined based on the time differential of the conflict probability in the second embodiment, but these can also be used in combination. For example, it is conceivable to define an evaluation function whose variables are the integrated value of the number of access conflicts at each time and the time differentiation of the conflict probability and to set the state level =1 when the evaluation function exceeds a threshold.

In the above embodiments, the state level =1 is set when the access conflict tendency is high, and the state level =2 is set when the integrated value of the number of conflicts exceeds the abnormality determination threshold. However, more state levels can be provided. For example, it is conceivable to subdivide the state level =1 in accordance with the integrated value of the number of access conflicts at each time and the time differential value of the conflict probability. In this case, it is also possible to perform the fail-safe process which is different for each state level.

Although the abnormality determination based on the access conflict tendency and the determination result thereof is performed by the conflict diagnosis unit 405/the abnormality determination unit 406/the conflict tendency determination unit 407 in the above embodiments, this corresponds merely to division of roles for convenience Thus, all or a part of these functional units may be integrally configured.

It has been described that the execution cycle of the first operation device 2 is temporarily changed in the above embodiments, but the execution cycle of the second operation device 3 may be temporarily changed in the same manner.

REFERENCE SIGNS LIST

1 ECU
2 first operation device
3 second operation device
4 program area
401 first operation device control unit
402 timer control unit
403 first cycle processing unit
404 exclusive control unit
405 conflict diagnosis unit
406 abnormality determination unit
407 conflict tendency determination unit
408 fail-safe unit
409 second operation device control unit
410 second cycle processing unit
411 second exclusive control unit
5 storage area
50100 parameter table
50200 record table
50300 number-of-allowable-conflicts table
50400 conflict record table

The invention claimed is:

1. A vehicle control apparatus that controls an operation of a vehicle, the vehicle control apparatus comprising:
   first and second operation devices which execute control operations to control the operation of the vehicle;
   a shared storage area to which both the first operation device and the second operation device access;
   an exclusive control unit which performs exclusive control such that the first operation device and the second operation device exclusively access the shared storage area; and
   an abnormality determination unit that determines an occurrence tendency of an access conflict when the first operation device and the second operation device access the shared storage area,
   wherein the abnormality determination unit compares a function expressed by a number of times of performing exclusive control and a number of access conflicts generated as a result of the exclusive control with a predetermined determination threshold to determine the occurrence tendency of the access conflict.

2. The vehicle control apparatus according to claim 1, wherein
   the abnormality determination unit uses a number of allowable conflicts representing the number of access conflicts allowed for the number of performing times as the determination threshold, and
   the abnormality determination unit compares the number of allowable conflicts with the number of access conflicts to determine the occurrence tendency of the access conflict.

3. The vehicle control apparatus according to claim 1, wherein
   the abnormality determination unit uses a conflict probability function, expressed by a conflict probability defined by a ratio of the number of access conflicts relative to the number of performing times and an elapsed time from a start of the exclusive control, as the function, and
   the abnormality determination unit compares a time differential of the conflict probability function with the determination threshold to determine the occurrence tendency of the access conflict.

4. The vehicle control apparatus according to claim 1, wherein
   the abnormality determination unit uses
   a composite function, obtained by combining
   the number of access conflicts and
   a conflict probability function expressed by
   a conflict probability defined by a ratio of the number of access conflicts relative to the number of performing times and an elapsed time from a start of the exclusive control, as the function, and the abnormality determination unit compares the composite function with the determination threshold to determine a tendency that the access conflict occurs.

5. The vehicle control apparatus according to claim 2, further comprising a cycle control unit that controls a cycle at which the first operation device executes the control operation, wherein the abnormality determination unit determines that the occurrence tendency of the access conflict exceeds an allowable range when the number of access conflicts exceeds the determination threshold, and the cycle control unit temporarily changes the cycle at which the first operation device executes the control operation when the abnormality determination unit determines that the occurrence tendency of the access conflict exceeds the allowable range.

6. The vehicle control apparatus according to claim 3, further comprising a cycle control unit that controls a cycle at which the first operation device executes the control operation, wherein the abnormality determination unit determines that the occurrence tendency of the access conflict exceeds an allowable range when the time differential of the conflict probability function exceeds the determination threshold, and the cycle control unit temporarily changes the cycle at which the first operation device executes the control operation when the abnormality determination unit determines that the occurrence tendency of the access conflict exceeds the allowable range.

7. The vehicle control apparatus according to claim 4, further comprising a cycle control unit that controls a cycle at which the first operation device executes the control operation, wherein the abnormality determination unit determines that the occurrence tendency of the access conflict exceeds an allowable range when the composite function exceeds the determination threshold, and the cycle control unit temporarily changes the cycle at which the first operation device executes the control operation when the abnormality determination unit determines that the occurrence tendency of the access conflict exceeds the allowable range.

8. The vehicle control apparatus according to claim 1, further comprising a fail-safe unit that executes a fail-safe process, wherein the fail-safe unit executes the fail-safe process when an integrated value of the number of access conflicts exceeds a predetermined integration threshold.

9. The vehicle control apparatus according to claim 2, further comprising a fail-safe unit that executes a fail-safe process, wherein the abnormality determination unit determines that the occurrence tendency of the access conflict exceeds an allowable range when the number of access conflicts exceeds the determination threshold, and the fail-safe unit temporarily changes the cycle at which the first operation device executes the control operation as the fail-safe process when the abnormality determination unit determines that the occurrence tendency of the access conflict exceeds the allowable range.

10. The vehicle control apparatus according to claim 3, further comprising a fail-safe unit that executes a fail-safe process, wherein the abnormality determination unit determines that the occurrence tendency of the access conflict exceeds an allowable range when the time differential of the conflict probability function exceeds the determination threshold, and the fail-safe unit temporarily changes the cycle at which the first operation device executes the control operation as the fail-safe process when the abnormality determination unit determines that the occurrence tendency of the access conflict exceeds the allowable range.

11. The vehicle control apparatus according to claim 4, further comprising a fail-safe unit that executes a fail-safe process, wherein the abnormality determination unit determines that the occurrence tendency of the access conflict exceeds an allowable range when the composite function exceeds the determination threshold, and the fail-safe unit temporarily changes the cycle at which the first operation device executes the control operation as the fail-safe process when the abnormality determination unit determines that the occurrence tendency of the access conflict exceeds the allowable range.

12. The vehicle control apparatus according to claim 8, wherein the fail-safe unit restarts the first operation device as the fail-safe process.

13. The vehicle control apparatus according to claim 8, wherein the fail-safe unit restarts the first operation device and the second operation device as the fail-safe process.

14. The vehicle control apparatus according to claim 8, wherein the fail-safe unit restarts the vehicle control apparatus as the fail-safe process.

* * * * *